(12) United States Patent
Gokturk et al.

(10) Patent No.: US 7,379,100 B2
(45) Date of Patent: May 27, 2008

(54) METHOD AND SYSTEM TO INCREASE DYNAMIC RANGE OF TIME-OF-FLIGHT (TOF) AND/OR IMAGING SENSORS

(75) Inventors: Salih Burak Gokturk, Mountain View, CA (US); Abbas Rafii, Palo Alto, CA (US)

(73) Assignee: Canesta, Inc., Sunnyvale, CA (US)

( * ) Notice: Subject to any disclaimer, the term of this patent is extended or adjusted under 35 U.S.C. 154(b) by 523 days.

(21) Appl. No.: 11/058,028

(22) Filed: Feb. 14, 2005

(65) Prior Publication Data

US 2006/0114333 A1 Jun. 1, 2006

Related U.S. Application Data

(60) Provisional application No. 60/544,653, filed on Feb. 12, 2004.

(51) Int. Cl.
*H04N 5/235* (2006.01)
(52) U.S. Cl. .................................. 348/229.1
(58) Field of Classification Search ............. 348/229.1
See application file for complete search history.

(56) References Cited

U.S. PATENT DOCUMENTS

| | | | |
|---|---|---|---|
| 4,277,167 A | 7/1981 | Eppel | |
| 4,708,473 A | 11/1987 | Metzdorff et al. | |
| 4,764,982 A | 8/1988 | Pfund | |
| 5,446,529 A | 8/1995 | Stettner et al. | |
| 5,682,229 A | 10/1997 | Wangler | |
| 5,818,977 A * | 10/1998 | Tansley | 382/294 |
| 5,835,204 A | 11/1998 | Urbach | |
| 5,892,575 A | 4/1999 | Marino | |
| 5,953,110 A | 9/1999 | Burns | |
| 6,137,566 A | 10/2000 | Leonard et al. | |
| 6,323,942 B1 * | 11/2001 | Bamji | 356/5.01 |
| 6,515,740 B2 * | 2/2003 | Bamji et al. | 356/141.1 |

* cited by examiner

*Primary Examiner*—James M. Hannett
(74) *Attorney, Agent, or Firm*—Canesta, Inc.; Michael A. Kaufman, Esq.

(57) ABSTRACT

Dynamic range of photodetector sensors useable in a TOF system is enhanced by capturing images of an object using multiple exposure time settings. Longer exposure settings more appropriately capture non-reflective and/or distant objects, while shorter exposure settings more appropriately capture reflective and/or closer objects. During parallel mode operation, detection signal readouts are taken from each photodetector at different time intervals within an overall exposure time. In sequential mode operation, detection signal readouts are taken and stored for each photodetector at the end of a first exposure time interval and the photodetectors are reset. After a second, different exposure time interval readouts are taken and stored, and the photodetectors reset, etc. In these modes one of the time exposure intervals will be relatively optimum for enhanced dynamic range operation. Once images with multiple exposure settings are obtained, best effort brightness and range images can be obtained, and motion artifacts can be reduced.

22 Claims, 12 Drawing Sheets

METHOD AND SYSTEM TO INCREASE DYNAMIC RANGE OF TIME-OF-FLIGHT (TOF) AND/OR IMAGING SENSORS

CROSS-REFERENCES TO RELATED APPLICATIONS

This application claims priority to U.S. Provisional Patent Application No. 60/544,653 filed 12 Feb. 2004, entitled A METHOD FOR INCREASING THE DYNAMIC RANGE OF TIME OF FLIGHT SENSORS, the entire contents of which is incorporated herein by this reference.

BACKGROUND OF THE INVENTION

1. Field of the Invention

The present invention relates generally to solid state sensors useable in time-of-flight (TOF) and/or imaging applications, and more specifically to systems and methods to enhance dynamic range for such sensors, including improving detection from weak signals returned by distant target objects.

2. Description of Related Art

Solid state sensors used in time-of-flight (TOF) applications are known in the art. Exemplary such TOF sensors are described in U.S. Pat. No. 6,323,942 to Bamji and entitled CMOS COMPATIBLE 3-D IMAGE SENSOR, the entire contents of which is incorporated herein by this reference. However before discussing TOF systems such as described in the '942 patent, it may be helpful to first consider earlier prior art systems that relied upon acquisition of luminosity data.

As used herein, sensors (e.g., cameras) are a two-dimensional array of pixel diode detectors formed on an integrated circuit (IC) substrate. The sensors output detection signals proportional to incoming optical energy falling on the array, which energy typically has been reflected from a target object some distance Z away.

Electronic circuits that provide a measure of distance from the circuit to an object are known in the art, and may be exemplified by system 10 FIG. 1. In the generalized system of FIG. 1, imaging circuitry within system 10 is used to approximate the distance (e.g., Z1, Z2, Z3) to an object 20. Typically system 10 will include a light source 30 whose light output is focused by a lens 40 and directed toward the object to be imaged, here object 20. Other prior art systems do not provide an active light source 30 and instead rely upon and indeed require ambient light reflected by the object of interest.

Various fractions of the light from source 30 may be reflected by surface portions of object 20, and is focused by a lens 50. This return light falls upon various detector devices 60, e.g., photodiodes or the like, in an array on an integrated circuit (IC) 70. Devices 60 produce a rendering of the luminosity of an object (e.g., 10) in the scene from which distance data is to be inferred. In some applications devices 60 might be charge coupled devices (CCDs) or even arrays of CMOS devices. CCDs typically are configured in a so-called bucket-brigade whereby light-detected charge by a first CCD is serial-coupled to an adjacent CCD, whose output in turn is coupled to a third CCD, and so on. This bucket-brigade configuration precludes fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process.

In FIG. 1 the upper portion of object 20 is intentionally shown more distant (Z3>Z3>Z1) and less reflective than the lower portion. In an range finder autofocus camera environment, devices 60 approximate average distance from the camera (e.g., from Z=0) to object 10 by examining relative luminosity data obtained from the object. Thus, in FIG. 1, the upper portion of object 20 is darker than the lower portion, and presumably is more distant from system 10 than the lower portion. In a more complicated scene, focal distance to an object or subject standing against a background would be approximated by distinguishing the subject from the background by a change in luminosity. In a range finding binocular application, the field of view is sufficiently small such that all objects in focus are at substantially the same distance. In the various applications, circuits 80, 90, 100 within system 10 would assist in this signal processing. As noted, if IC 70 includes CCDs 60, other processing circuitry such as 80, 90, 100 are formed off-chip.

Unfortunately, as described above, reflected luminosity data does not provide a truly accurate rendering of distance because the reflectivity of the object is unknown. A distant object surface with a shiny surface may reflect as much light (perhaps more) than a closer object surface with a dull, less reflective, finish.

Further, in very brightly or very dimly illuminated scenes, system 10 may either saturate due to insufficient dynamic range, or simply fail to output data that is useful.

A different approach is described in the '942 patent, in which a high speed time of flight (TOF) system was adopted that acquired both luminosity (intensity) data and TOF data. FIG. 2A is a generic block diagram depicting a TOF system 200, according to the '942 invention. System 200 can be fabricated on a single IC 210, requires no moving parts, and relatively few off-chip components, primarily a source of optical energy 220 and associated optical focusing system. Indeed if suitable shielding were provided, one might bond laser source 220 onto the common substrate upon which IC 210 is fabricated. Optical energy source 220 is preferably an LED or a laser that emits energy 35 with a wavelength of perhaps 800 nm, although other wavelengths could instead be used. Below 800 nm wavelength, emitted light starts to become visible and laser fabrication becomes more difficult. Above 900 nm laser efficiency drops off rapidly, and in any event, 1100 nm is the upper wavelength for a device fabricated on a silicon substrate, such as IC 210. As noted, by emitted light pulses having a specific wavelength, and by filtering out incoming light of different wavelength, system 200 is operable with or without ambient light. The ability of system 200 to function in the dark can be advantageous in certain security and military type imaging applications. As described below, circuitry within system 200 detects optical energy 35' reflected by object 20, and determines from time of flight (TOF) the distance Z to the object.

System 200 includes an array 230 of pixel photodetectors (or photodiodes) 240, each of which has dedicated circuitry 250 to process detection charge output by the associated detector. In a typical application, array 230 might include 100×100 pixels 230, and thus include 100×100 processing circuits 250. Preferably IC 210 also includes a microprocessor or microcontroller unit 260, memory 270 (which preferably includes random access memory or RAM and read-only memory or ROM), a high speed distributable clock 280, and various computing and input/output (I/O) circuitry 285. Among other functions, controller unit 260 may perform distance to object and object velocity calculations. Preferably the two-dimensional array 230 of pixel sensing detectors is fabricated using standard commercial silicon technology, which advantageously permits fabricating circuits 250, 260, 270, 280, and 285 on the same IC. Understandably, the ability to fabricate such circuits on the same IC with the array of pixel detectors can shorten processing and delay times, due to shorter signal paths. Various design considerations for CMOS implementation of system 200 are set forth in the '942 patent.

FIG. 2B exemplifies circuit 250 is associated with each pixel detector 240 in FIG. 2A. Circuit 250 includes a pulse peak detector 300, a high speed counter 310, and has access to high speed clock 280, which preferably outputs a continuous train of high frequency clock pulses that are coupled to the input port of each high speed counter 310. Exemplary clock pulses might exhibit perhaps 250 ns pulse width at a fixed frequency of perhaps 2 GHz with a duty cycle of perhaps 0.1% while the pulses are being output. Each counter 310 has a port to receive a START signal (e.g., start now to count), a port to receive a STOP signal (e.g., stop counting now), and a port to receive a CONTROL signal (e.g., reset accumulated count now). The CONTROL and START signals are available from controller 260, the CLOCK signal is available from clock unit 280, and the STOP signal is available from pulse peak detector 300.

Prior art system 200 operates as follows. At time t0, microprocessor 260 commands light source 220 to emit a pulse of light of known wavelength, which passes through focus lens 290' and travels to object 20 at the speed of light (C), 300 Km/sec. If light source 220 is sufficiently powerful, lens 290' may be dispensed with. At the surface of the object being imaged at least some of the light may be reflected back toward system 200 to be sensed by the detector array. Lens 290 preferably focuses filtered incoming optical energy onto sensor array 230 such that each pixel in the array receives light from only one particular point (e.g., an object 20 surface point) in the field of view. The properties of light wave propagation allow an ordinary lens 290 to be used to focus the light onto the sensor array. If a lens is required to focus the emitted light, a single lens could be used for 290, 290' if a mirror-type arrangement were used.

At or before time t0, each pixel counter 310 in array 230 receives a CONTROL signal from controller 260, which resets any count previously held in the counter. At time t0, controller 260 issues a START command to each counter, whereupon each counter begins to count and accumulate CLOCK pulses from clock 280. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

The fundamental nature of focus lens 290 associated with system 200 is such that reflected light from a point on the surface of imaged object 20 will only fall upon the pixel in the array focused upon such point. Thus, at time t1, photon light energy reflected from the closest point on the surface of object 20 will pass through a lens/filter 290 and will fall upon the pixel detector 240 in array 230 focused upon that point. A filter associated with lens 290 ensures that only incoming light have the wavelength emitted by light source 220 falls upon the detector array unattenuated.

Assume that one particular pixel detector 240 within array 230 is focused upon a nearest surface point on object 20. The associated detector 300 will detect current that is output by the pixel detector in response to the incoming photon energy from such object point. Preferably pulse detector 300 is implemented as an amplifying peak detector that senses a small but rapid change in pixel output current or voltage. When the rapidly changing output current is sufficiently large to be detected, logic within detector 300 (e.g., an SR flip-flop) toggles to latch the output pulse, which is provided as the STOP signal to the associated counter 310. Thus, the number of counts accumulated within the associated counter 310 will be indicative of roundtrip TOF to the near surface of object 20, a calculable distance Z1 away.

Distance Z1 may be determined from the following relationship in which C is the velocity of light:

$$Z1 = C \cdot (t1)/2 \qquad \text{Eq. (1)}$$

At some later time t2 photon energy will arrive at lens 290 from a somewhat more distant portion of object 20, and will fall upon array 230 and be detected by another pixel detector. Hitherto the counter associated with this other detector has continued to count CLOCK pulses starting from time t0, as indeed have all counters except for the counter that stopped counting at time t1. At time t2, the pulse detector associated with the pixel just now receiving and detecting incoming photon energy will issue a STOP command to the associated counter. The accumulated count in this counter will reflect roundtrip TOF to the intermediate point on object 20, distance Z2 away. Within IC 210, controller 260 executing software stored in memory 270 can calculate distance and velocity associated with the TOF data for each light reflecting point on the object surface. Such data, or even raw TOF data, may be exported from the IC as DATA, perhaps to be further processed off-chip. Preferably DATA is exported in a format compatible to computer processing systems.

In similar fashion, at time t3 yet another pixel detector in the array will detect sufficient just-arriving photon energy for its associated pulse detector 300 to issue a STOP command to the associated counter. The accumulated count in this counter represents TOF data for the farthest distance Z3 of object 20.

Some pixels in array 230 may of course not receive sufficient reflected light from the object point upon which they are focused. Thus, after a predetermined amount of time (that may be programmed into controller 260), the counter associated with each pixel in the sensor array will have been stopped due to pulse detection, or will be assumed to hold a count corresponding to a target at distance Z=infinity.

In a motion picture application, e.g., where system 200 is perhaps used to calculate surface distances to objects to be matted, assume that the sensor array is to operate continuously at 30 frames per second, which is to say each frame shall last less than 0.33 seconds. In this application, objects at distances greater than about 50,000 Km (e.g., Z=C 0.33 s/2) cannot be detected. In practical applications, however, system 200 will normally be used to image objects within a range of 100 m or less, and the above theoretical limit will not pose a problem. Thus, the predetermined time will be approximate 660 ns (e.g., 100 m 2/C), and any pixel not outputting a peak detection pulse after 660 ns may safely be assumed to be focused upon a target image point at Z=infinity.

With each detected reflected light pulse, the counter-calculated TOF distance value for each pixel in the array is determined and preferably stored in a frame buffer in RAM associated with unit 270. Preferably microprocessor 260 examines consecutive frames stored in RAM to identify objects in the field of view scene. Microprocessor 260 can then compute object velocity. In addition to calculating distance and velocity, the microprocessor and associated on-chip circuitry can be programmed to recognize desired image shapes. Any or all of this data (denoted DATA in FIG. 2A) can be exported from the IC to an external computer for further processing, for example via a universal serial bus.

The above example described how three pixel detectors receiving photon energies at three separate times t1, t2, t3 turn-off associated counters whose accumulated counts could be used to calculate distances Z1, Z2, Z3 to object 20. In practice, the present invention will process not three but thousands or tens of thousands of such calculations per each light pulse, depending upon the size of the array. Such processing can occur on IC chip 210, for example using microprocessor 260 to execute routines stored (or storable) in memory 280. Each of the pixel detectors in the array will have unique (x, y) axis locations on the detection array, and the count output from the high speed counter associated with each pixel detector can be uniquely identified. Thus, TOF data gathered by two-dimensional detection array 230 may be signal processed to provide distances to a three-dimensional object surface. Output from CMOS-compatible detectors 240 advantageously may be accessed in a random manner if desired, which permits outputting TOF DATA in any order.

In practical applications, sensor array 230 preferably has sufficient resolution to differentiate target distances on the order of 1 cm, which implies each pixel must be able to resolve time differences on the order of 70 ps (e.g., 21 cm/C). In terms of a CMOS-implemented system specification, high speed counters 310 must be able to resolve time to within about 100 ps, and peak pulse detectors 300 must be low-noise high speed units also able to resolve about 100 ps with a detection sensitivity on the order of perhaps a few microvolts (µV). Accurate distance measurements will require that the pulse detector response time be removed from the total elapsed time. Finally, the CLOCK signal output by circuit 280 should have a period on the order of about 100 ps.

In one embodiment of the '942 patent, each pixel detector 240 has an associated circuit 250 that includes an associated shutter and charge accumulator or integrator circuit 600, such as shown in FIG. 2C. Output from each pixel photodetector 240 is coupled to a dedicated amplifier 610 whose output is coupled via a shutter S1 to a charge accumulator or integrator, shown here symbolically as a capacitor C1. Shutter S1 can be open (current passing) or closed (current-blocking). Shutter S1 may be a high-speed electronic switch, or an opto-mechanical shutter such as a ferroelectric material whose opaqueness may be rapidly altered in response to electronic control signals.

FIG. 2D depicts timing relationship for the embodiment of FIG. 2C, according to the '942 patent. At an initial time t0, energy emitter 220 (see FIG. 2A) emits a pulse of energy 35 having pulse width PW represented by a time difference (Tep-To), and having an arbitrary energy level A. Some of the emitted energy will be reflected by target object 20 and is returned as a reflected pulse 35'. The beginning of the return pulse 35' will arrive at system 200 at time t1, and the round trip time-of-flight (TOF) from emission of pulse 35 to beginning of return pulse 35' is (t1−t0). Shutter S1 will remain open from time t0 until time Ts during which time the associated capacitor C1 will integrate charge. Let Vos be the signal that results when the shutter is open for substantially the time duration PW, and Vcs is the signal that results when the shutter is open continuously. As such, VosNcs represents the ratio of the integration time with the shutter operating and with the shutter open. Integration time with the shutter open is PW, and integration time with the shutter operating is Tshutter=PW·(VosNcs). Integration time (Tshutter) starts at time t1 when the return pulse is received, and ends at time Ts when the shutter is closed. As indicated by FIG. 2D, $$T\text{shutter}=(Ts-t1)=PW-\{TOF-(Ts-Tep)\}. \qquad \text{Eq. (2)}$$

It follows from these timing relationships for Tshutter that:

$$TOF = \frac{Vcs - Vos}{Vcs} * PW + Ts - Tep. \qquad \text{Eq. (3)}$$

Indeed, an electronic shutter may be constructed using a controlled source such as a current-controlled current source. A pixel detector will produce a current Is proportional to the number of received photons, which may be mirrored with a current-controlled current source to produce current Im, where $$Im=K\cdot Is \qquad \text{Eq. (4)}$$

where K is a constant. Rather than directly measure pixel detector charge, charge on capacitor C1 is measured. The shutter may be closed by turning-off the current-controlled current source such that Im=0, in which case current Is no longer affects capacitor C1.

Any incoming light photons falling upon detector 240 will produce a current that is amplified by unit 610. As long as shutter S1 is open, the amplified charge-detected pixel output from unit 610 will charge capacitor C1. Conversely, when shutter S1 is closed, no additional charge from unit 610 is received by charge accumulator or integrator C1.

Thus, for an object relatively near the pixel detector, substantially all of the light pulse generated photons from the object surface can reach the detector before the shutter closes. However, for a relatively distant object, photons resulting from the end of the light source pulse may not have sufficient time to reach the sensor before the shutter closes and hence will be discarded. By calculating the fraction of photons from the pulse that are blocked by the shutter, distance Z to the object can be computed.

Controller or processor 260 causes circuit 285 to drive light source 220 to emit a pulse of light at time t0. However at or before time t0, controller 260 causes each charge integrator C1 to discharge any charge, and then opens the associated shutter S1. In response to being illuminated with the emitted light pulse, different portions of the surface of object 20 reflect optical energy 35' back towards system 200.

Eventually pixels focused upon the nearest surface of object 20 (e.g., at distance Z1 in FIG. 2A) begin to detect incoming photons. The current charge from these pixels is amplified by amplifier 610 and charges, via the open shutter S1, capacitor C1. As long as S1 is open C1 will continue to accumulate charge. After a while, pixels focused upon slightly further object distances begin to detect incoming photons, and begin to accumulate charge on their own accumulator C1, via their individual amplifier and shutter.

Note that integrators C1 associated with pixels focused on nearer object surfaces begin to integrate charge sooner in time than other integrators, and thus can accumulate more charge per unit time. After a time approximating the emitted light pulse width, controller 260 causes all shutters to close, preferably simultaneously. At this point, the accumulated charge on each accumulator C1 is static, or frozen. If desired, some or all of the shutters may be opened in any desired sequence, including randomly, rather than simultaneously.

Accumulated charge magnitude for each C1 for each pixel provides direct roundtrip TOF data to the object point upon which such pixel is focused, e.g.: $i1=C1\cdot(\Delta V/\Delta t)$, where $i1$ is current output by a pixel detector, C1 is the associated current integrator, $\Delta V$ is the signal change across C1 resulting from accumulated charge current, and $\Delta t$ is the time over which the charge is accumulated.

Preferably one set of data is collected with all shutters remaining open for perhaps the period of the emitted light pulse train frequency. Charge gathered during this data set represents point-by-point reflected luminosity for the object surface. Such charge permits correcting for errors caused by more distant but more reflective object surface portion. For TOF>0, the underlying relationship is given by:

$$TOF=[(Vcs-Vos)/Vcs]\cdot PW+Ts-Tep, \qquad \text{Eq. (5)}$$

where Vcs is the signal resulting from the continuously open shutter, Vos is the signal resulting from a shutter opened for substantially the light pulse width duration, Tep is time of pulse end, Ts is time shutter closed, and PW is the time duration of the light pulse width.

If a shutter remained open, the total number of photons falling on a pixel detector is given by $No=K\cdot PW$, where K is a constant that depends on the illumination intensity of the object, object reflectivity, and lens aperture. If $Ts-(t0+2Z/C)<PW$, the shutter will clip the tail-end of the reflected light pulse energy, and the number of effective photons received by the pixel detector will become:

$$Ns=K\cdot(Ts-t0-2Z/C) \qquad \text{Eq. (6)}$$

from which distance Z is obtained as:

$$Z=C/2\cdot(Ns\cdot PW/No+t0-TS) \qquad \text{Eq. (7)}$$

Accuracy of the above method depends on how accurately Ns can be measured. Ns and No are obtained by measuring the resulting charge on the sensor, for example using an A/D converter. Using a laser light source power of about 10 W, a 1 cm distance difference can result in variation $\Delta Ns$ of Ns of about a hundred photons. To boost the accuracy multiple pulses in a cumulative fashion can be performed. Optical source 220 is pulsed repeatedly without clearing charge on the sensor between pulses. The charge on the sensor is thus the cumulative charge produced by all the reflected light pulses for which photo energy is detected. The cumulative charge is proportional to the cumulative number of effective photons summed over the number (n) of all pulses. By way of example, charge difference for a 1 cm distance change will be $n\cdot\Delta Ns$, which for n=100 results a charge difference $n\cdot\Delta Ns$ on the order of tens of thousands of photons.

It will be appreciated that on one hand system 200 may produce inadequate results if incoming optical energy 35' is too low in magnitude to be detected accurately. On the other hand, if the magnitude of incoming optical energy 35' is too large in magnitude, various pixel detectors 240 may saturate, which also would preclude accurate detection measurements.

It is apparent from the foregoing that accurate TOF measurements depend upon the ability of sensor array 230 to output meaningful detection data over a wide magnitude of incoming optical energy 35'. Thus there is a need for a system and method to enhance dynamic range and to improve weak signal detection from TOF sensors.

The present invention provides such a system and methods.

BRIEF SUMMARY OF THE INVENTION

A sensor system with an array of photodiode detectors acquires both luminosity and TOF data over a wide dynamic range of incoming optical energy. Dynamic range (DR) may be defined as:

$$DR = \frac{Intensity_{max}}{Intensity_{min}} \qquad \text{Eq. (8)}$$

where $Intensity_{max}$ and $Intensity_{min}$ represent respectively the maximum and minimum intensities of incoming optical energy that the sensor array can respond to with reasonably accurate measurements for distance Z to an object returning the sensed optical. Dynamic range (DR) of the sensor system is increased by capturing images of a target object using a software and/or hardware implemented shutter to create multiple exposure time settings during which the detectors sense incoming optical energy. Longer exposure time settings more appropriately capture non-reflective and/or distant target objects, while shorter exposure time settings more appropriately capture reflective and/or closer target objects. Multiple exposure settings may be obtained with a sensor system that acquires multiple exposures that begin simultaneously in parallel time and having different exposure time durations, and/or with a sensor system that acquires multiple exposures sequentially during a longer exposure time, where the longest such exposure time is deemed the long exposure.

Motion between acquired frames of images can be estimated using multiple exposures to reduced motion artifacts. Once images with multiple exposure settings are acquired, best effort brightness and range images can be obtained to improve the imagery.

Other features and advantages of the invention will appear from the following description in which the preferred embodiments have been set forth in detail, in conjunction with their accompanying drawings.

The method and system to increase dynamic range of time-of-flight (TOF) and/or imaging sensors of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
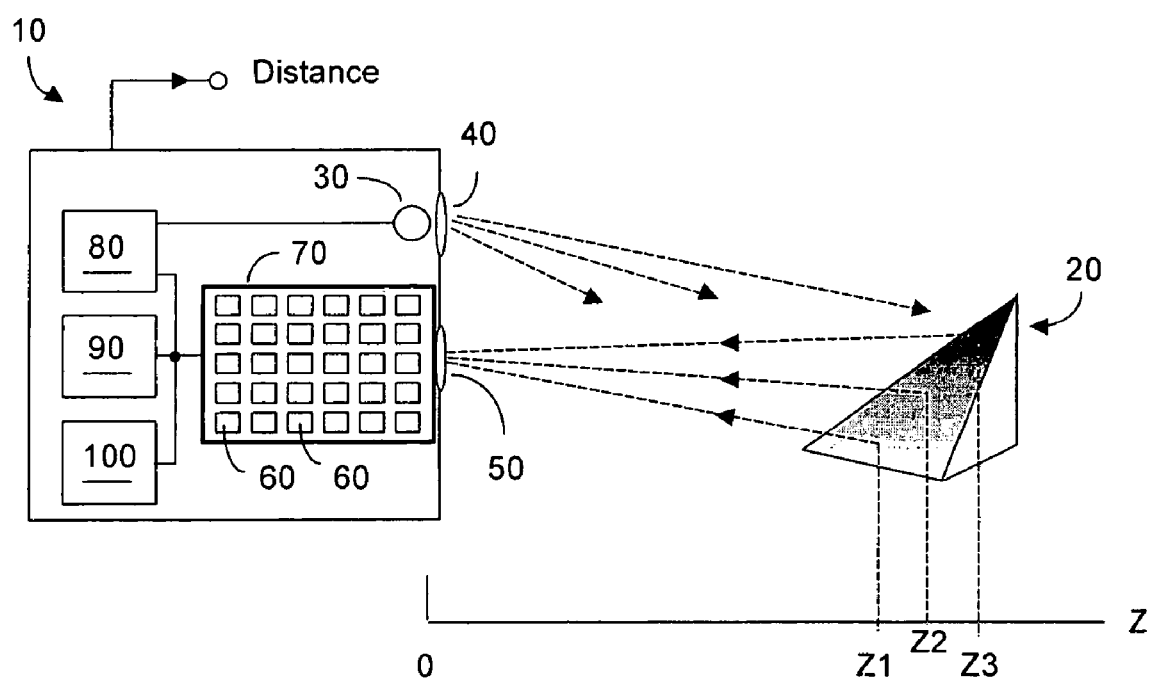
FIG. 1 depicts an imaging/range finding system that relies upon luminosity data, according to the prior art.
Figure 2A:
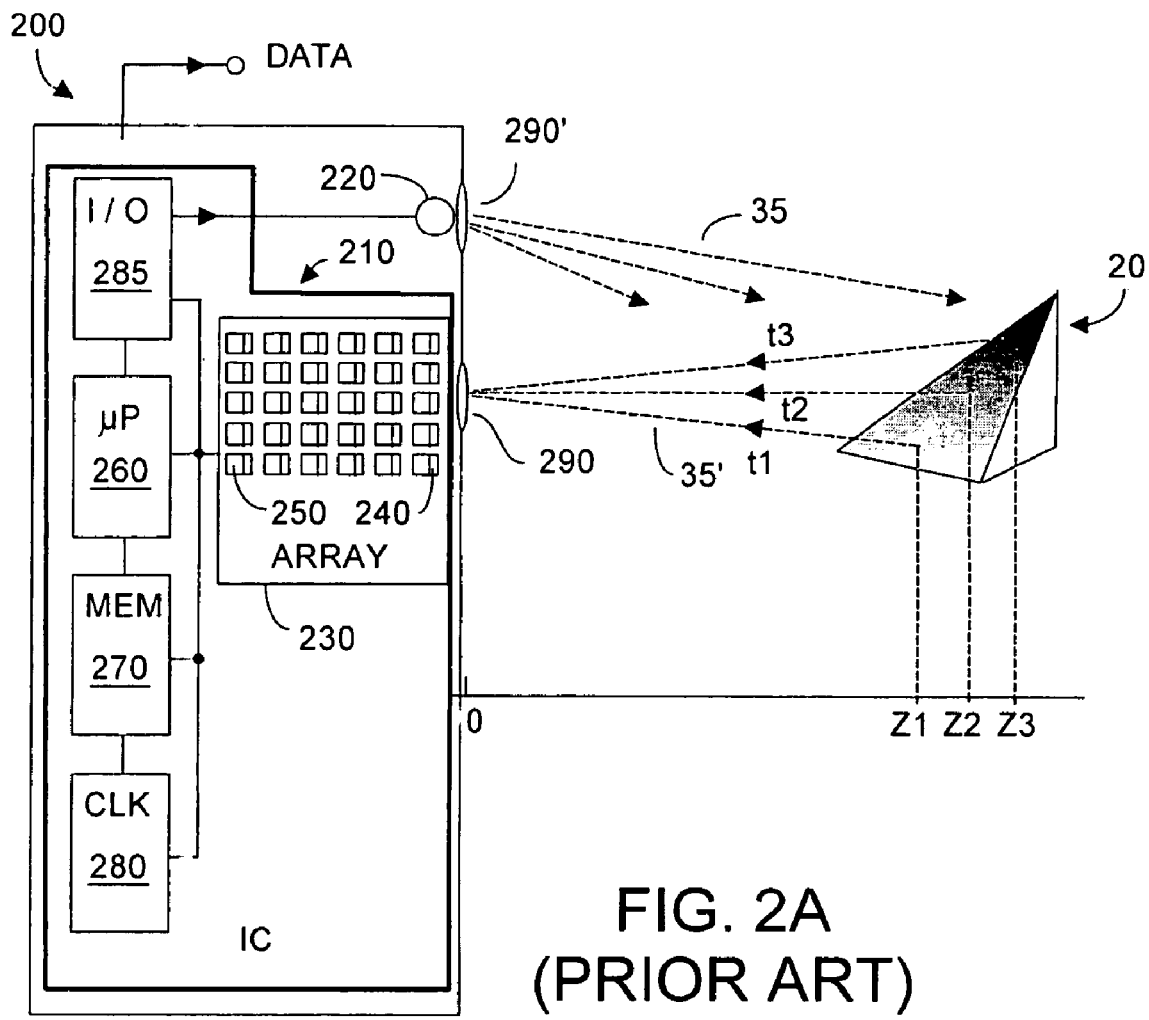
FIG. 2A is a block diagram of an imaging/range finding time-of-flight system, according to the prior art.
Figure 2B:
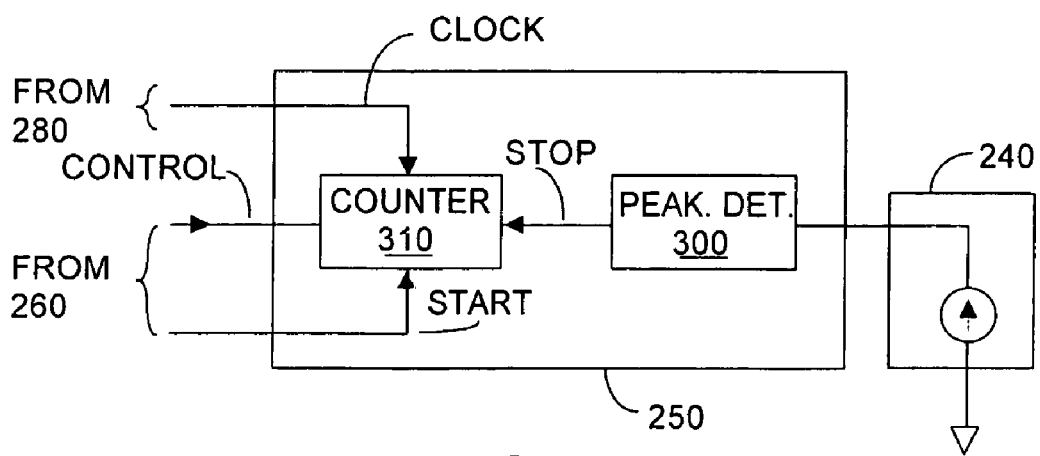
FIG. 2B is a is block diagram showing an individual pixel detector with associated photon pulse detector and high speed counter as used in the system of FIG. 2A, according to the prior art.
Figure 2C:
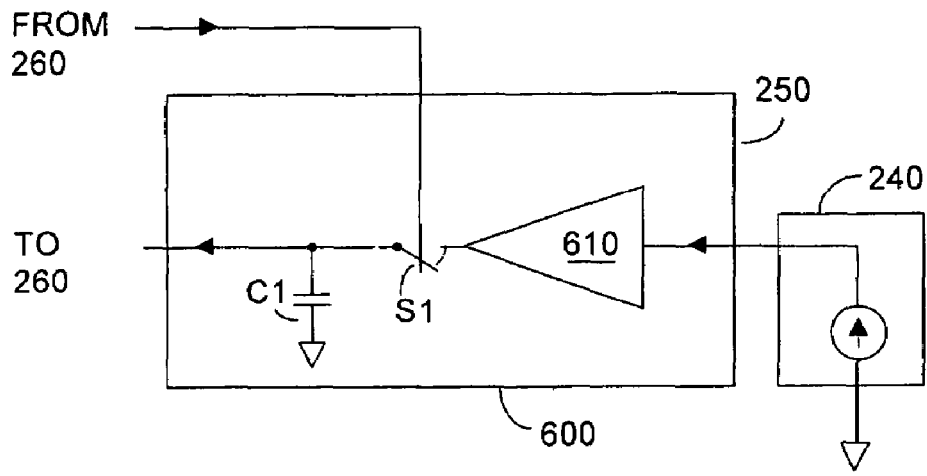
FIG. 2C depicts an embodiment of the system of FIG. 2A provided with an electronic shutter mechanism, according to the prior art.
Figure 2D:
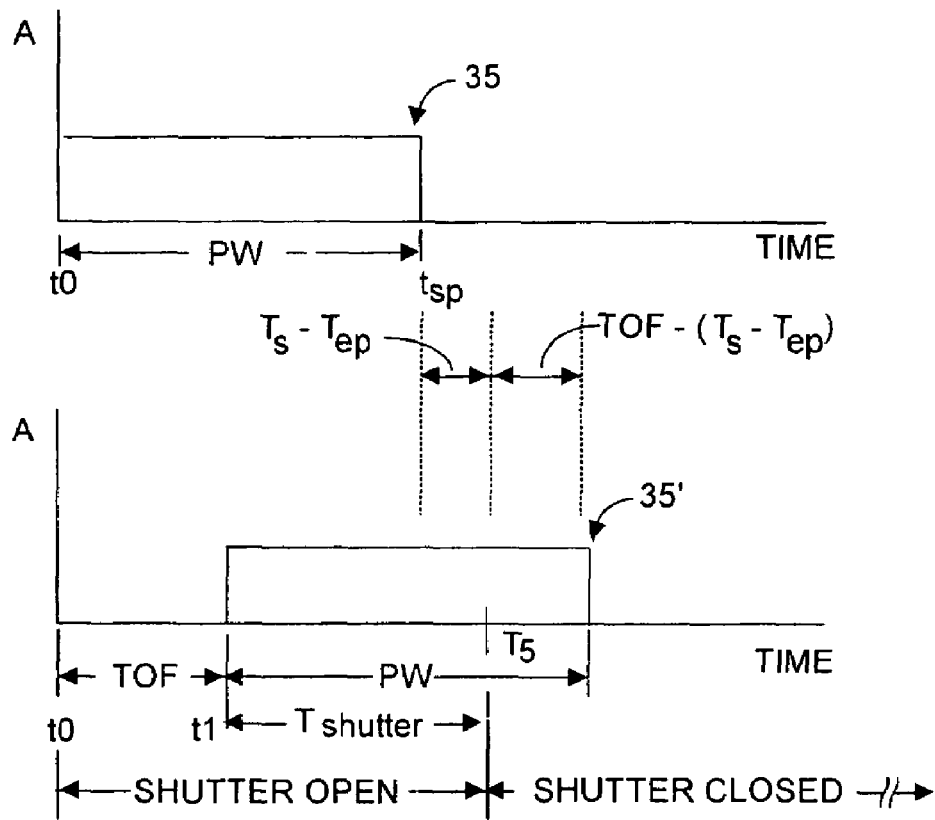
FIG. 2D depicts exemplary timing relationships for the shutter mechanism of FIG. 2C, according to the prior art.
Figure 3A:
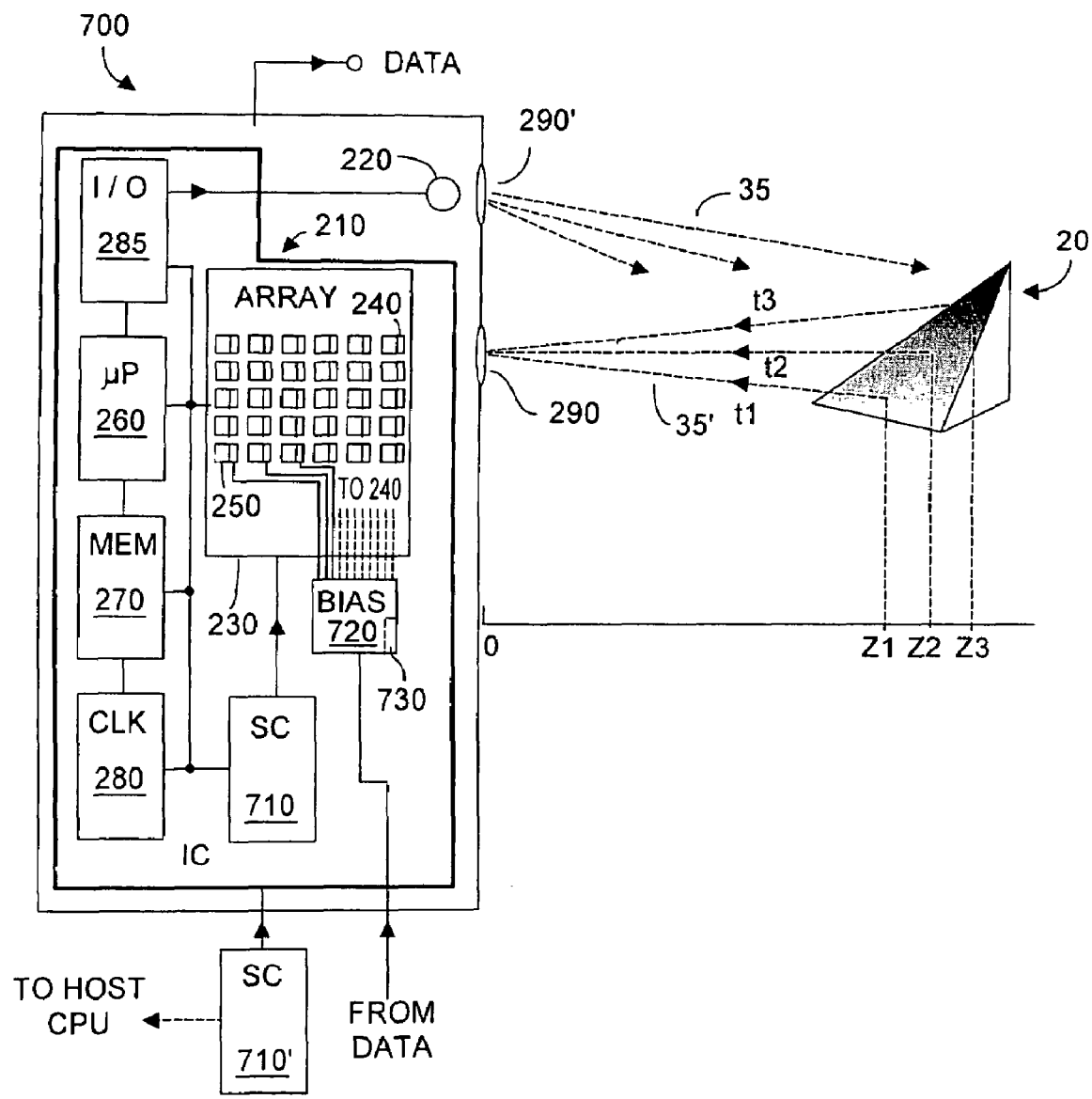
FIG. 3A is a block diagram of an imaging/range finding time-of-flight system, according to the present invention.

FIG. 3A is a block diagram of an imaging/range finding TOF system 700, according to the present invention. Unless noted otherwise, elements in FIG. 3A that are identified with reference numerals described with respect to FIG. 2A may be regarded as being the same elements. Within array 240, photodetectors 240 respond to incoming optical energy 35' within a dynamic range (DR). As noted, $$DR = \frac{Intensity_{max}}{Intensity_{min}} \qquad \text{Eq. (9)}$$

where $Intensity_{max}$ and $Intensity_{min}$ represent respectively the maximum and minimum intensities of incoming optical energy 35' that sensor array 230 can respond to with reasonably accurate measurements for distance Z to an object 30 returning the sensed optical energy. Dynamic range is often expressed as $20 \cdot \log_{10}(DR)$. Detectors 240 within array 230 will exhibit a substantially similar DR, typically in a range of perhaps 15 dB to perhaps 60-dB. While each photodetector will exhibit a substantially similar dynamic range, some photodetectors will "see" regions of object 20 that are relatively close an/or relatively reflective, and thus will receive substantially more optical energy than other photodetectors. As will now be described, the present invention includes a multiple shutter control unit 710 that enhances dynamic range of array 230, and thus of system 700.

Control unit 710 automatically control different shutter settings. Multiple shutter control unit 710 advantageously enables system 700 to capture or acquire images of object 20 using multiple exposures, which is to say using multiple shutter time regimes. The terms exposure and shutter may be used interchangeably herein. Multiple shutter control unit 710 can be implemented in various ways. In the embodiment shown in FIG. 3A, the software is embedded in the system memory 270, and executed via the system CPU 260. Alternatively, shutter control is implemented with off-chip unit 710' via software in a host computer CPU (not shown). In yet another embodiment, the shutter control unit is directly implemented in hardware. The role of bias unit 720 and optional randomizer unit 730 will be described later herein.

Capturing object 20 over multiple exposures of time implies that some of the exposures will be more optimum for the existing light conditions than if multiple exposures were not acquired. For example, if ambient light is quite bright and/or object 20 is relatively close and/or highly reflective, at least some of the multiple exposures may be over a time regime that is relatively short. Images (or DATA) acquired over such short time regime means magnitude of incoming optical energy 35' is less likely to saturate detectors 240 in array 230. On the other hand, if ambient light conditions are dark, and/or object 20 is far away and/or relatively non-reflective, images acquired over multiple exposures will include at least some images over longer time exposures. The longer time exposures are more likely to result in successful capture of images relatively centered within the dynamic range of sensor array 230.

Figure 3B:
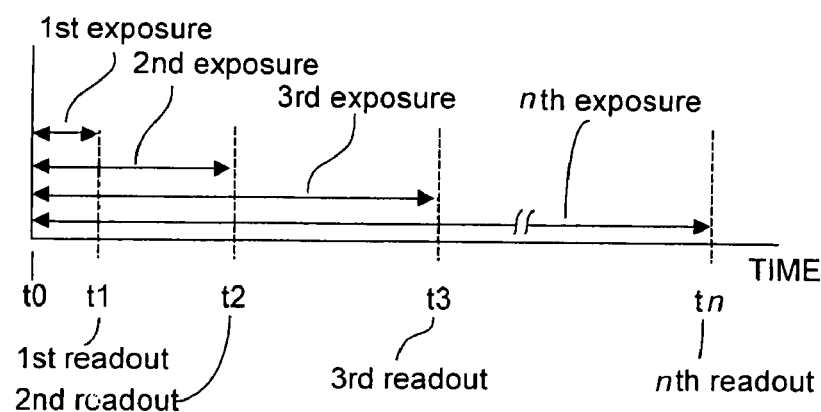
FIG. 3B is a block diagram depicting parallel mode shutter exposure, according to the present invention.

Control unit 710 can cause system 700 to operate in a parallel and/or sequential shutter exposure mode. Parallel mode operation will be described first with respect to FIG. 3B. At time t0, control unit 710 causes the shutter to "open" allowing each pixel detector 240 to begin to acquire photon energy from incoming optical energy 35'. At time t1, control unit 710 causes the first exposure time to be end and a readout from all detectors is made and stored, e.g., in memory 270. The shutter remains "open", however, and all detectors continue to detect. At time t2 a second exposure time is deemed over (having lasted from t0 to t2) and all detectors are again read-out and their current detection signals stored, e.g., in memory 270. The shutter remains "open", however, and all detectors continue to detect. At time t3 the third exposure time is deemed over (having lasted from t0 to t3), detector read-outs are stored, and so forth. The number of exposure times n can be varied, and values of n ranging from $2 \leq n \leq 30$ were found useful, as described later herein. The time durations defining the first, second, third, etc. exposures can be increased linearly, logarithmically, or otherwise. If desired, the nature of the time durations could be adjusted dynamically by sensing incoming optical energy, for example using information contained in the DATA signals. However since different photodetectors 240 would "see" different intensity levels of incoming radiation, ideally adjustment would be made on a per pixel detector basis, or less ideally, on a per-group of pixel detector basis.

Figure 3C:
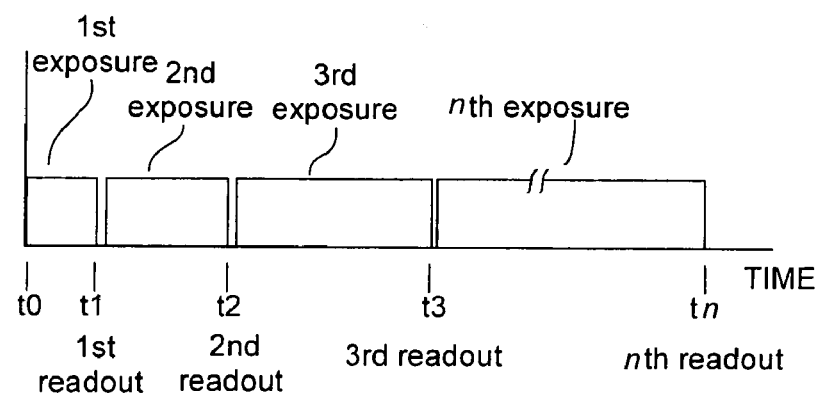
FIG. 3C is a block diagram depicting sequential mode shutter operation, according to the present invention.
Figure 4A:
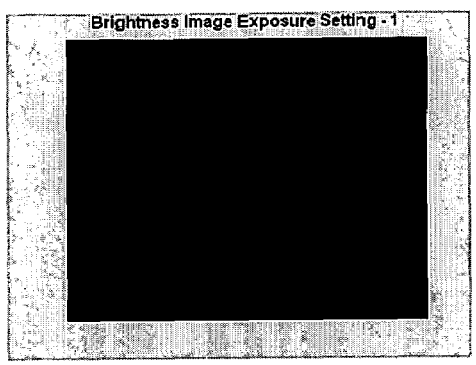
FIGS. 4A and 4B are respective acquired luminosity and range images of objects using a brightness and a range exposure setting of n=1, according to the present invention.
Figure 4B:
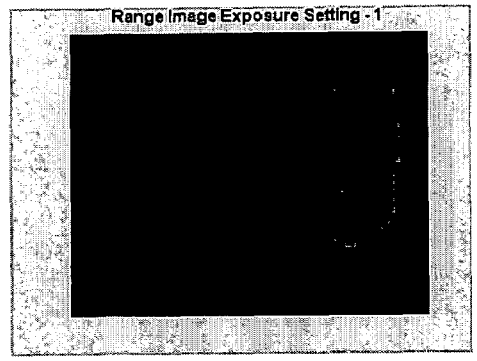
Figure 4C:
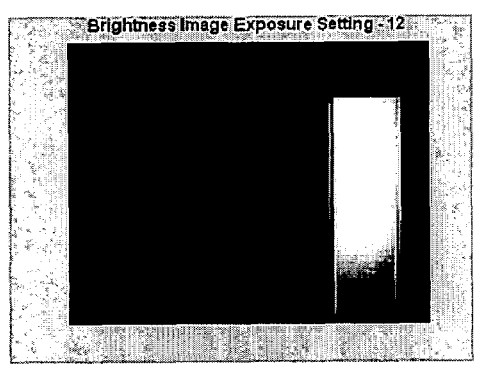
FIGS. 4C and 4D are respective acquired luminosity and range images of objects using a brightness and a range exposure setting of n=12, according to the present invention.
Figure 4D:
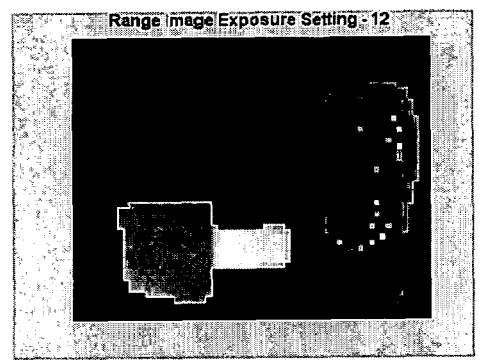
Figure 4E:
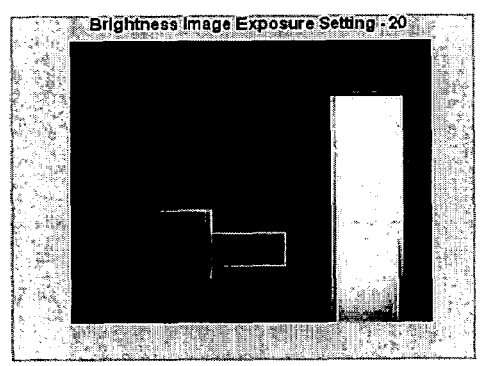
FIGS. 4E and 4F are respective acquired luminosity and range images of objects using a brightness and a range exposure setting of n=20, according to the present invention.
Figure 4F:
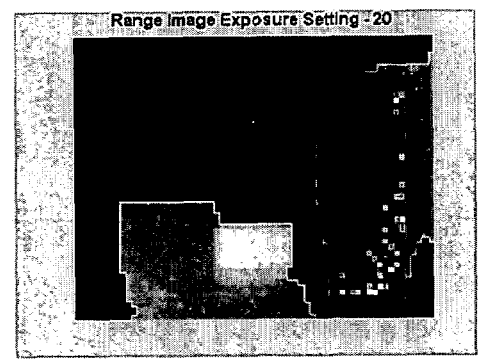
Figure 4G:
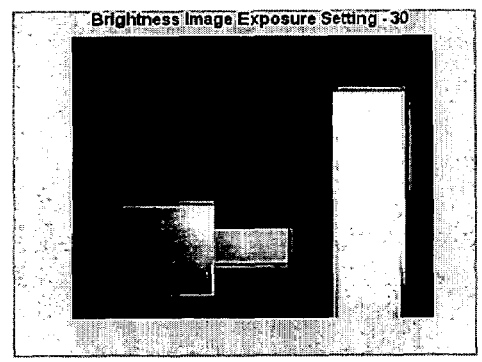
FIGS. 4G and 4H are respective acquired luminosity and range images of objects using a brightness and a range exposure setting of n=30, according to the present invention.
Figure 4H:
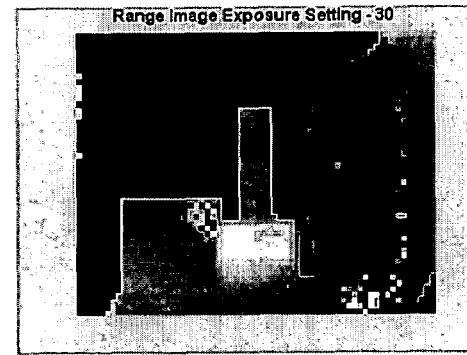

FIG. 3C depicts a sequential exposure mode operation of control unit 710. At time t0 control unit 710 causes the shutter to "open" and each pixel photodetector 240 in array 230 begin to acquire photon energy from incoming optical energy 35'. At time t1, control unit 710 causes the first exposure time to be end and a readout from all photodetectors is made and stored, e.g., in memory 270, and the shutter is "closed". All photodetectors are then reset, discharging their previously accumulated detection charge. Control unit 710 then "opens" the shutter and all photodetectors again begin to detect incoming photon energy until time t2, whereupon the shutter is "closed", detection ceases, and photodetector read-outs are made and stored. Again all photodetectors are then reset. Control unit 710 then "opens" the shutter whereupon all detectors again detect until time t3, whereupon the shutter is "closed", read-outs made and stored, and so on. It is seen that unlike the parallel mode shutter operation described with respect to FIG. 3B, sequential mode shutter operation requires resetting the photodetectors after each time exposure. As with the above-described parallel mode, time durations defining the first, second, third, etc. exposures can be increased linearly, logarithmically, or otherwise. The number n of exposure time regimes can be varied, and values of n ranging from $2 \leq n \leq 30$ were found useful. As noted above, the nature of the n durations could be adjusted dynamically, for example using information contained in the DATA signals.

It will be appreciated that by varying the number n of time exposure regimes during which photodetectors 240 acquired image data, that dynamic range can be enhanced. The performance gain G obtained using multiple shutter exposures (parallel mode or sequential mode) is given by $$G = 20 \cdot \log_{10} \frac{shutter_{max}}{shutter_{min}} \quad \text{Eq. (10)}$$

where $shutter_{max}$ and $shutter_{min}$ are respectively largest and shortest exposure times. However the following relationship must be satisfied, where DR is the dynamic gain (dB) of the detector system without multiple shutters, e.g., where n=1:

$$20 \cdot \log_{10} \frac{shutter_i}{shutter_{i-1}} \leq DR \quad \text{Eq. (11)}$$

where $shutter_i$ and $shutter_{i-1}$ denote adjacent time exposures. Equation (2) needs to be satisfied to avoid discontinuities in the operational spectrum of the multiple-exposure system. As an example, for an object of fixed reflectivity, the system might operate between 50 cm and 2 meters, and between 3 meters and 6 meters, avoiding what might be termed an operational discontinuity between 2 meters and 3 meters.

Assume that detector array 230 would exhibit a dynamic range DR=20 dB without using multiple shutters. From the above relationships, it follows in this example that $$20 \cdot \log_{10} \frac{shutter_i}{shutter_{i-1}} \leq 20 \quad \text{Eq. (12)}$$

which means the ratio $$\frac{shutter_i}{shutter_{i-1}} \leq 10. \quad \text{Eq. (13)}$$

Thus if shutter 1 has a time duration of say 1 ms, then the adjacent shutter 2 can have a time duration of up to 10 ms. In this example, the improvement in dynamic range is $$G = 20 \cdot \log_{10} \frac{shutter_2}{shutter_1} \quad \text{Eq. (14)}$$

or 20 dB. Thus dynamic range (dB) of an array system having n=2 multiple shutter exposures according to the present invention is 20·(original DR)+20 (improvement DR G)=20 dB+20 dB=40 dB. If the system were operated with n=3 multiple shutter exposures, the overall dynamic range would be 60 dB, and so forth.

The range of time exposure intervals will depend on several factors including the characteristics of system 700, the anticipated range for Z, the size and reflectivity of target objects 20. For applications where Z is on the order of say 30 m, longer shutter exposure times are required than for applications where Z is on the order of say 10 cm. Exemplary longer shutter exposure times might be on the order of 500 ms, whereas exemplary shorter shutter exposure times might be on the order of perhaps 5 ms to perhaps 10 ms. For example, in the parallel mode operation depicted in FIG. 3B, where Z was in the 50 cm to 120 cm range, exposure time t1 might be say 3 ms, exposure time t2 might be say 8 ms, and so on. One can work backwards from the nominal given dynamic range of a detector array to approximate a relationship between the various time exposures. For example in a 20 dB detector array system, if the maximum anticipated optical energy intensity is 10 times nominal, then there could be a multiplication of ten for adjust time exposures, e.g., 0.1, 1, 10, 100, and so on.

It will be appreciated that DATA from system 700 can be used to produce both a range or Z-image, and an intensity (or luminosity or brightness) image. Of course DATA can also be used to generate Z and velocity of object 20. Methods by which best effort range images can be acquired using data from multiple range images will now be described. As used herein, the term best effort implies a relatively optimum time exposure regime to acquire a luminosity image and/or a range image.

FIGS. 4A-4H depict range images acquired with system 700, wherein control unit 710 (or 710') caused exposure time to be increased linearly over multiple exposure settings. The target objects 20 that were imaged in these figures were wooden blocks of different reflectivity, placed at different distances Z from sensor system 700. The closest objects were about 50 cm distant and were relatively reflective, and the more distance objects were about 120 cm and were less reflective. Original images 4A-4H were in color and are color-coded such that the color becomes brighter as Z increases. In the gray scale counterparts submitted herein, brightness increases going from FIGS. 4A-4B, to 4C-4D, to 4E-4F, to FIG. 4G-4H. When the acquired brightness is within an acceptable level, a valid range value is produced at the particular pixel detector 240. In observing the range images (FIGS. 4B, 4D, 4F, and 4H) note that in FIG. 4B, objects at the farthest range are barely perceived by the sensor array. Further, in going from FIG. 4F to FIG. 4H, the closest objects start to saturate the pixel detectors. As such, there was no time duration setting that would produce reliable depth (Z) values for close and far objects at the same time. It is seen, however, that if system 700 is operated so as to acquire images of an object over multiple exposures, the likelihood is increased that at least some of the images will be acquired within the useful dynamic range of sensor array 230.

One method to improve and maintain good dynamic range for sensor array 230 is to bias photodetector sensors 240 as a function of detected incoming optical energy 35', e.g., bias provided to photodetectors 240 would be varied as a function of number of acquired photons. As such, measurements could vary slightly depending on the amount of optical energy falling upon the sensor array. A measure of optical energy presented to the sensor array can be obtained by examining the intensity (or luminosity) image, e.g., an image proportional to amplitude A of incoming optical energy 35'. Referring still to FIG. 3A, a DATA signal is coupled as input to a photodetector bias unit 720, whose outputs are coupled to bias photodiodes 240 in detector array 230. The DATA signal used will include a measure of intensity A of the acquired image. Thus, having acquired multiple intensity images (e.g., images shown in FIGS. 4A, 4C, 4E, 4G), at every pixel 240-$x$ in array 230, obtain a function $$F_x(I) = R,\qquad \text{Eq. (15)}$$

where I and R are intensity and range readings respectively. In practice, F will be a digital function with n data points, where n is the number of exposure settings. The algorithm preferably implementing the method would automatically determine the exposure measurement to use for each pixel detector.

In one embodiment, reduction or substantial cancellation of the effect of incoming optical energy intensity bias upon range values can result by using a fixed bias value of $I_0$ for all pixel detectors. In such embodiment, bias unit 720 can provide Io to the various pixel detectors 240. In this case, the best effort range image is obtained by using $R_x = F_x(I_0)$ at every pixel x. Note that function F might not have values at every intensity level, and specifically at $I_0$. However, linear interpolation and extrapolation techniques can be used to obtain the range value at every pixel photodiode 240-$x$ at intensity level $I_0$.

Figure 5A:
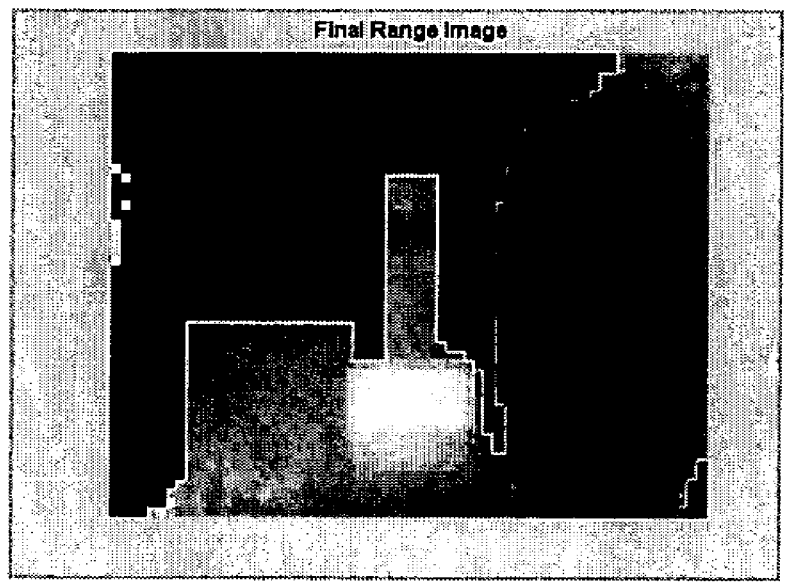
FIGS. 5A and 5B are best effort range images acquired using n=5 exposures (FIG. 5A) and n=30 exposures (FIG. 5B), as determined from best multiple exposure settings depicted in FIGS. 4A-4H, according to the present invention.
Figure 5B:
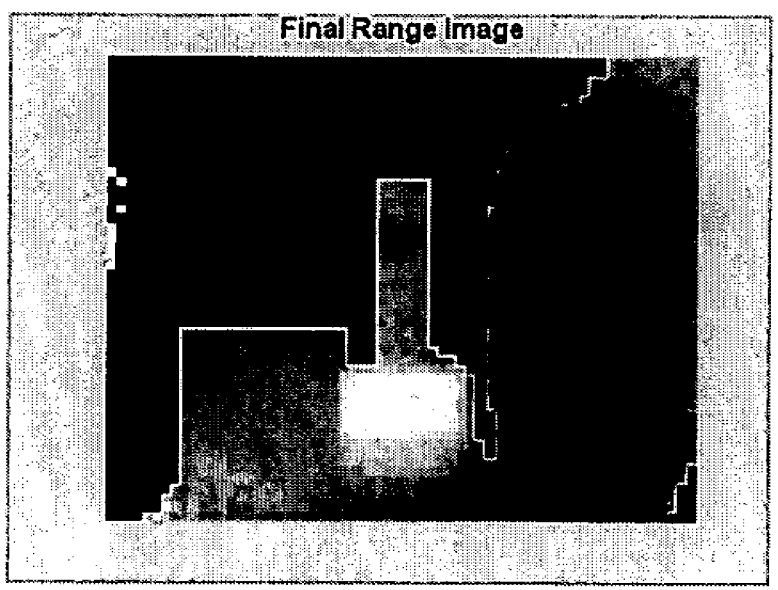

FIGS. 5A and 5B depict best effort range images made using the multiple exposure settings depicted in FIGS. 4A-4H, where n was increased until better images were acquired, e.g., acquired in a more favorable dynamic range regime of detector array 230. More specifically, range image FIG. 5A was acquired with n=5 exposures, and range image FIG. 5B was acquired with n=30 exposures. Best values for n were determined from FIGS. 4A-4H. Note that in FIGS. 5A and 5B, both near and far objects now yield useable range values, within the dynamic range of sensor array 230. For this particular scene, n=5 and n=30 produced similar range results. Understandably once a useful value of n is determined, it is not necessary to further increase n, and in practice it was observed that n=2 was generally sufficient for most of the acquired image scenes.

Alternatively, once function F is obtained for each pixel detector 240-$x$, a random selection can be chosen from the acceptable values. Thus in FIG. 3A, a randomizer unit 730 may be provided as shown. An acceptable value would be a value obtained without pixel detector saturation but with sufficient optical energy 35' to make the measurement. Selection can be carried out by randomly assigning one of the acceptable values.

Methods by which best effort brightness images may be acquired from multiple brightness images will now be described. Best effort brightness results can be obtained in a similar fashion as has been described with respect to acquiring best effort Z-images.

Input parameters are the intensity (brightness) images that result from each exposure setting. Let $I_x(E)$ be the intensity reading for pixel detector 240-$x$, and exposure setting E, where $E = E_1, E_2, \ldots E_n$ and $E_i < E_{i+1}$ for $\forall i$, where I is the index of the exposure setting, and n is the number of exposure settings.

In one embodiment, obtaining best effort images is a two-step method that includes first mapping all the images $I(E_j)$ to the same reference brightness level, and then increasing dynamic range by non-linear transformation. Without any limitation, one of the images can be chosen as the reference frame for referencing the brightness levels, perhaps the first image, as in the following example.

The first method step, mapping all images $I(E_j)$ to the same reference, may be carried out, without limitation, as follows. As an exemplary algorithm, find K(j) such that the non-saturated and non-zero valued pixels in image $I(E_j)$ and $I(E_{j-1})$ have a ratio of K(j) between them:

$$K(j) = \frac{1}{M} \sum_{\substack{I_x(E_j)>0, I_x(E_j)<Sat,\\ I_x(E_{j-1})>0, I_x(E_{j-1})<Sat}} \frac{I_x(E_j)}{I_x(E_{j-1})} \qquad \text{Eq. (16)}$$

where M is the number of pixel photodetectors that are non-zero and non-saturated in both $I(E_j)$ and $I(E_{j-1})$. K(j) can be found for $\forall j$, j=2, 3 . . . n. Since every image j is referenced to the previous image (j−1), the first image determines the reference level in this example. Let $R^j$ be the same-reference intensity image that is obtained for exposure $E_j$. Let $R^j$ be the same-reference intensity value for pixel photodetector 240-$x$, and exposure $E_j$. In one embodiment, $R^j_x$ can be obtained as follows:

$$R^j_x = \begin{cases} 0 & \text{if } I_x(E_j) = 0 \\ I_x(E_j) & \text{if } I_x(E_j) > 0 \;\&\; I_x(E_j) < sat \\ K(j) \cdot R^{j-1}_x & \text{if } I_x(E_j) > sat \end{cases} \qquad \text{Eq. (17)}$$

In another embodiment, K(j) are predetermined numbers, given various exposure settings. In yet another embodiment, K(j)'s are given as the ratio of $E_j$ and $E_{j-1}$, i.e.

$$K(j) = \frac{E_j}{E_{j-1}} \qquad \text{Eq. (18)}$$

The above assumes the amount of electrons collected by the photodiodes increases linearly with time exposure.

The second method step increases detector dynamic range using a non-linear transformation. Input parameter here is the same reference-brightness image R. Image R may include large values due to the multiplication factor in its equation and thus a downscaling may be useful, in addition to mapping the image to the desired dynamic range. Any of several algorithms may be used to achieve this task. In one embodiment, a logarithmic scale function can be used. Let the data be represented with a number of bytes equal to b, in which case the final image will have a number of intensity levels $I=2^b$. Let T be the final intensity image and let $T_x$ be its value at pixel 240-$x$. Let a be the maximum intensity value in image R, i.e., $$a=R_x \text{ where } R_x>R_y, \forall x,y. \quad \text{Eq. (19)}$$

Let m be $$m = a^{\frac{1}{I}}$$

whereupon final image T can be obtained such that for $\forall x$:

$$T_x=\log_m(R_x) \quad \text{Eq. (20)}$$

Figure 6A:
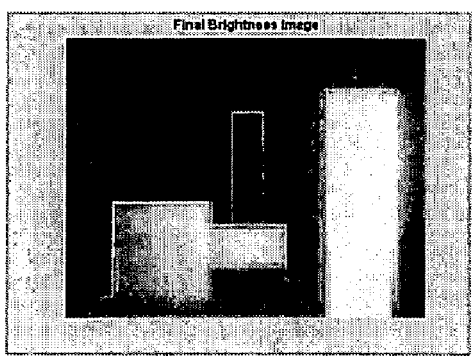
FIGS. 6A-6C depict best effort brightness images acquired using logarithmic scaling with n=3, n=5, and n=30 exposure settings respectively, according to the present invention.
Figure 6B:
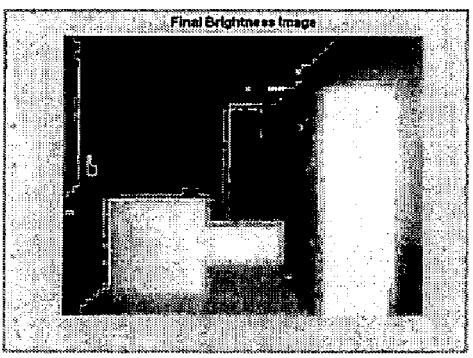
Figure 6C:
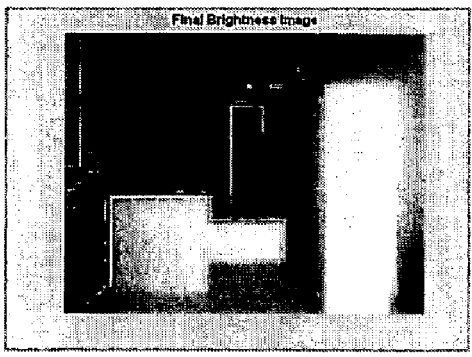

FIGS. 6A-6C depict final best effort final brightness images T acquired using logarithmic scaling with n=3, n=5, and n=30 exposure settings. Note that details of the separation between the dark and bright objects advantageously become more apparent as n increases.

Another embodiment of the present invention applies histogram equalization methods. First a histogram of the image R is obtained. Normalizing the histogram allows obtaining a distribution function of the intensity values in image R. This can be treated as a probability distribution function. Let f(i) be the probability distribution function of intensity level i in image R, and let F(i) be the cumulative distribution function of intensity level i in image R. The histogram equalized image T may be obtained in the following manner:

$$T_x=F(R_x). \quad \text{Eq. (21)}$$

Figure 7A:
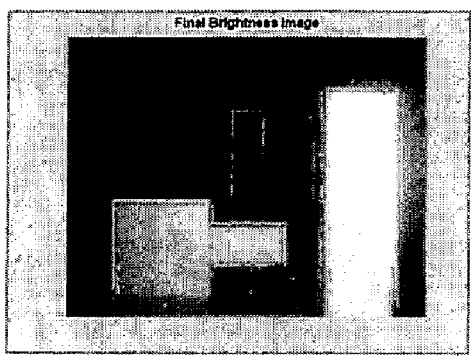
FIGS. 7A-7C depict best-effort brightness images obtained using histogram equalization with n=3, n=5, and n=30 exposure settings respectively, according to the present invention.
Figure 7B:
Figure 7C:
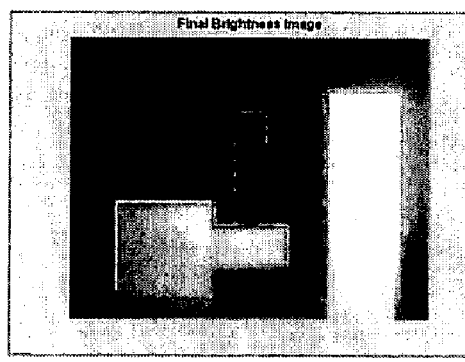

The image obtained using histogram equalization will have a probability distribution function that is approximately uniform. FIGS. 7A-7C depict best-effort brightness images obtained using histogram equalization for the case n=3, n=5, and n=30 exposure settings, respectively.

Alternatively a linear stretching function can be applied to obtain image T from image R. Further, if desired different methodology can be applied on different intensity intervals of image R. For example logarithmic scale may be applied over one interval, and a linear stretching applied over another interval. Without limitation, an exemplary linear stretching may be implemented as follows. First, the interval of the brightness values is determined. This interval is then scaled up such that the low end of the interval is assigned as the minimum value of the brightness levels, and maximum value of the interval is assigned as the maximum value of the brightness levels.

Figure 8A:
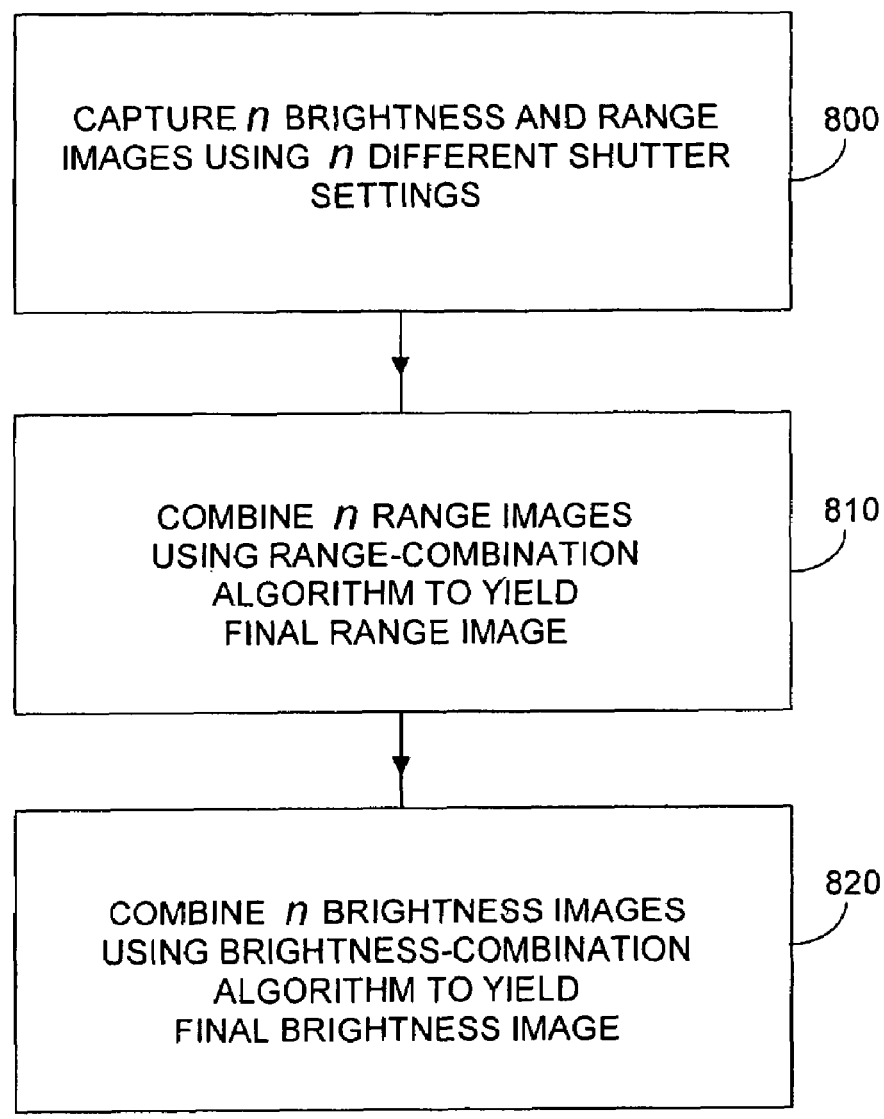
FIG. 8A is a flow chart depicting an exemplary algorithm to implement multiple shuttering of a photodetector array, according to the present invention.
Figure 8B:
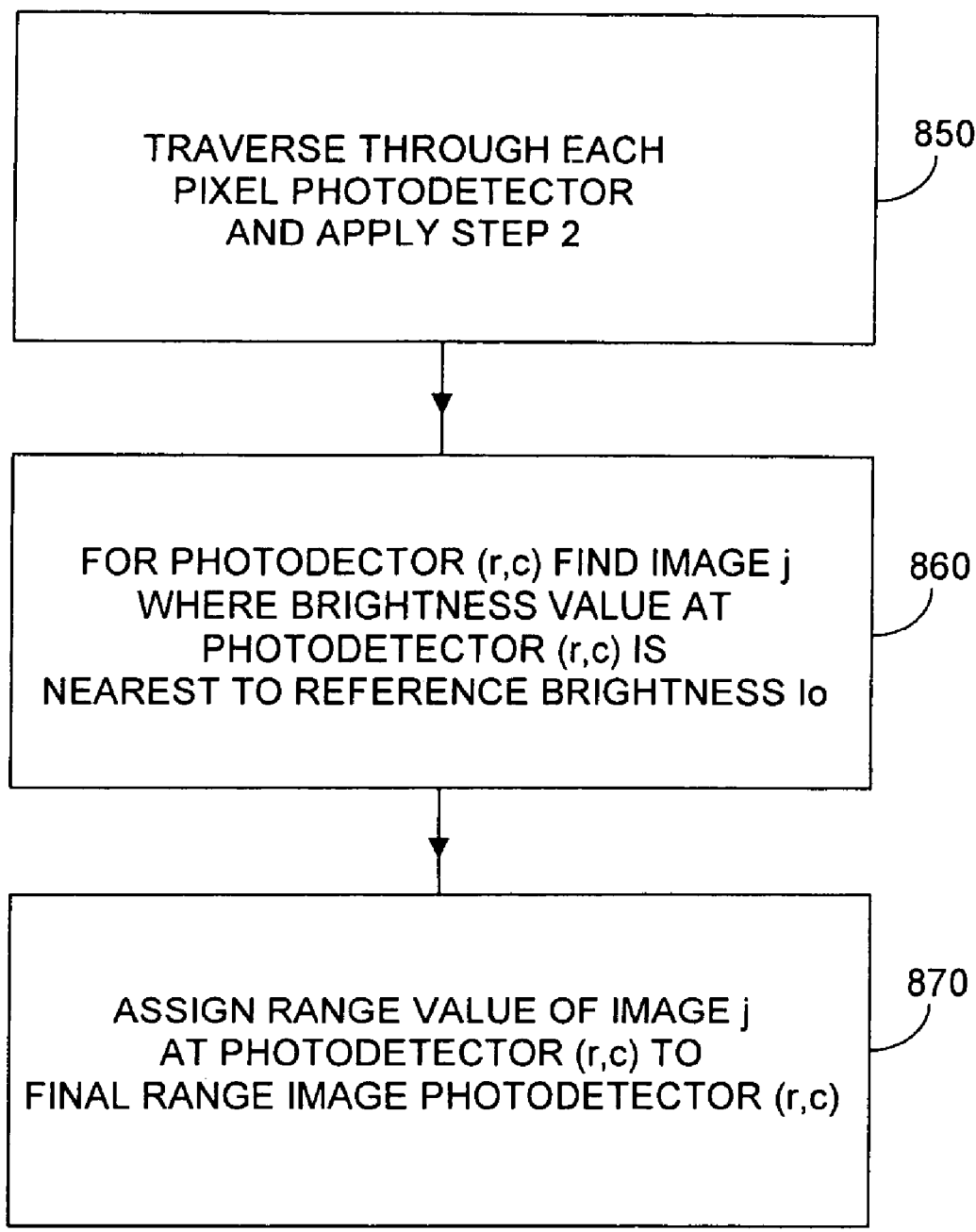
FIG. 8B is a flow chart depicting an exemplary algorithm to implement final range image determination, according to the present invention.
Figure 8C:
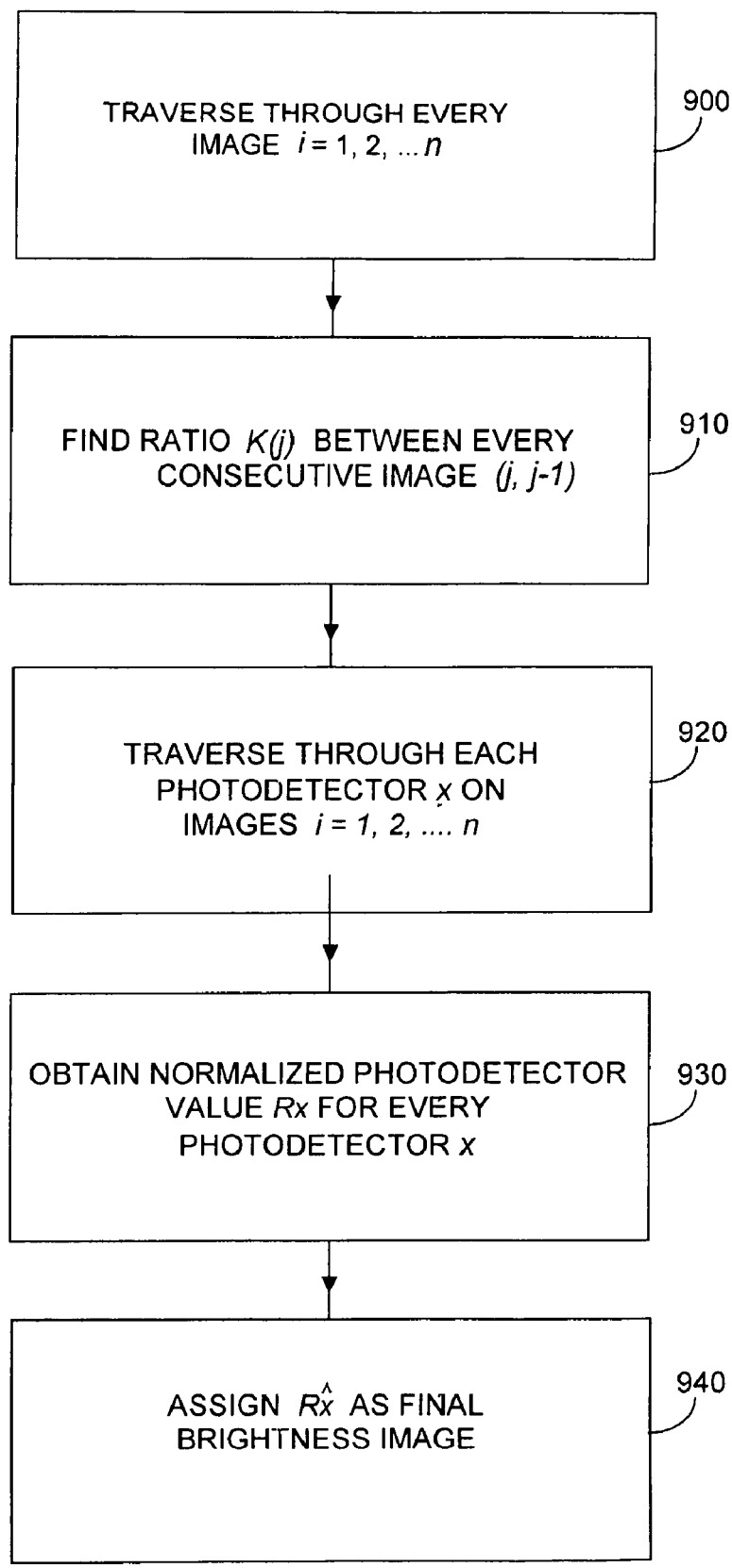
FIG. 8C is a flow chart depicting an exemplary algorithm to implement final brightness image determination, according to the present invention.

FIGS. 8A, 8B, and 8C are flow charts depicting exemplary algorithms described above. FIG. 8A depicts an exemplary methodology implementing multiple shutter mode of the present invention. At method step 800, a number n of different shutter exposure settings is used to acquire n brightness images and n range (or Z) images of an object. At method step 810, a range-combination algorithm, for example that depicted in FIG. 8B, is used to combine the n range images to yield a final range image. At method step 820, the n brightness images are combined using a brightness-combination algorithm, for example that depicted in FIG. 8C, to yield a final brightness image. As noted earlier herein, this algorithm (and indeed the other algorithms discussed herein) may be stored in memory 270 for execution by processor 260, with input from control unit 710 (or if off-chip, control unit 710').

In FIG. 8B, array 230 includes rows and columns of pixel photodetectors 240, and at step 850, every pixel photodetector (r, c), e.g. photodetector located at array row, column coordinate (r, c) in the array is traversed by carrying out method steps 860 and 870 upon the photodetector. At step 860, an image j is found for each photodetector whose brightness value at photodetector (r, c) is nearest in magnitude to a reference brightness Io. At step 870, a range value of image j is assigned at photodetector (r, c) to yield a final range image photodetector (r, c). As noted, the method steps executing this exemplary algorithm may be carried out on IC chip 210.

In FIG. 8C, at step 900 each of the n acquired images is traversed, and at step 910 a ratio K(j) is found between each consecutive image. At step 920, each photodetector x (e.g., photodetector 240-$x$) is traversed on the n acquired images. At step 930, normalized photodetector values Rx are obtained for each photodetector x, and at every image i. The earlier-described method for mapping all images $I(E_j)$ to the same reference may be carried out by finding K(j) with the desired ratio $$K(j) = \frac{1}{M} \sum_{\substack{I_x(E_j)>0, I_x(E_j)<Sat, \\ I_x(E_{j-1})>0, I_x(E_{j-1})<Sat}} \frac{I_x(E_j)}{I_x(E_{j-1})} \quad \text{Eq. (22)}$$

where parameters are as described earlier. Again, $R^j_x$ can be obtained as:

$$R^j_x = \begin{cases} 0 & \text{if } I_x(E_j) = 0 \\ I_x(E_j) & \text{if } I_x(E_j) > 0 \ \& I_x(E_j) < sat \\ K(j) \cdot R^{j-1}_x & \text{if } I_x(E_j) > sat \end{cases} \quad \text{Eq. (23)}$$

Next, at step 940 in FIG. 8C, a value $R_{\bar{x}}$ is assigned as the final brightness image.

In summary, various embodiments have been described to increase dynamic range of photodiode sensor array 230, for use in acquiring an intensity (or brightness or luminosity) image and a TOF image. Multiple exposure settings are implemented, by operating the sensor array with multiple exposures taken simultaneously, or by obtaining multiple readings over a long exposure time interval. Data from multiple exposure images may be used to enhance overall dynamic range of the detector array. Further, motion between acquired frames of images can be estimated using multiple exposures to reduced motion artifact.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method to enhance dynamic range of an array of photodetectors responsive to incoming optical energy returned from an object a distance Z away to determine at least distance Z to said object, said photodetectors having a dynamic range in dB of DR before application of the method, the method including:
   (a) enabling said photodetectors to receive said incoming optical energy during a long time interval;
   (b) within said long time interval, at the end of each of a number n of unequal time duration sub-intervals storing a detection output signal from each of said photodetectors, where n>1 and wherein at least a pair of said unequal time duration sub-intervals, denoted shutter$_i$ and shutter$_{i-1}$, satisfy a relationship $$20 \cdot \log_{10} \frac{shutter_i}{shutter_{i-1}} \leq DR;$$

(c) determining a best quality one of n detection signals stored at step (b); and
   (d) repeating step (b) and step (c) thereafter as needed.

2. The method of claim 1, wherein at step (b) said unequal time duration sub-intervals are related to each other in a manner selected from a group consisting of (i) linearly, (ii) non-linearly, and (iii) logarithmically.

3. The method of claim 1, wherein at step (c), determining is based upon examination of images formed from at least one of (i) luminosity components of said incoming optical energy detected by said photodetectors, (ii) variation in ranges of Z in range images, and (iii) magnitude of signal-to-noise in ranges of Z in range images, and further including assigning a range associated with a best quality detection signal as a final measure of range Z.

4. The method of claim 1 wherein if n=2, improvement G in dB of dynamic range of said photodetectors is given by $$G = 20 \cdot \log_{10} \frac{shutter_2}{shutter_1}.$$

5. The method of claim 1, wherein step (d) includes selectively repeating step (b) for at least some of said photodetectors determined at step (c) to be functioning marginally within their operational dynamic range.

6. The method of claim 1, further including adjusting bias potential to at least some photodetectors determined at step (c) to be functioning marginally within their operational dynamic range.

7. The method of claim 1, wherein step (c) includes at least one step selected from a group consisting of: (i) examination of images formed from luminosity components of said incoming optical energy detected by said photodetectors; (ii) mapping all said images to a common brightness level; and (iii) increasing dynamic range of said photodetectors by applying one of (1) non-linear transformation, (2) histographic equalization of normalized common brightness levels, (3) a linear stretching function to said common brightness level; and wherein step (c) also includes setting all brightness signals to a common brightness level, and using a most recently determined said common brightness level as a final measure of brightness.

8. The method of claim 1, wherein each step is carried out under microprocessor control using a microprocessor and memory fabricated on a common integrated circuit substrate containing at least said array of photodetectors.

9. A method to enhance dynamic range of an array of photodetectors responsive to incoming optical energy returned from an object a distance Z away to determine at least distance Z to said object, said photodetectors having a dynamic range in dB of DR before application of the method, the method including:
   (a) controllably enabling said photodetectors to receive said incoming optical energy during n sequential unequal time duration sub-intervals;
   (b) at the end of each of said n unequal time duration sub-intervals storing a detection output signal from each of said photodetectors, where n>1 and wherein at least a pair of said unequal time duration sub-intervals, denoted shutter$_i$ and shutter$_{i-1}$, satisfy a relationship $$20 \cdot \log_{10} \frac{shutter_i}{shutter_{i-1}} \leq DR;$$

(c) determining a best quality one of n detection signals stored at step (b); and
   (d) repeating step (b) and step (c) as needed thereafter.

10. The method of claim 9, wherein at step (b) said unequal time duration sub-intervals are related to each other in a manner selected from a group consisting of (i) linearly, (ii) non-linearly, and (iii) logarithmically.

11. The method of claim 9, wherein at step (c), determining is based upon examination of images formed from at least one of (i) luminosity components of said incoming optical energy detected by said photodetectors, (ii) variation in ranges of Z in range images, and (iii) magnitude of signal-to-noise in ranges of Z in range images, and further including assigning a range associated with a best quality detection signal as a final measure of range Z.

12. The method of claim 9, wherein if n=2, improvement G in dB of dynamic range in dB of said photodetectors is given by $$G = 20 \cdot \log_{10} \frac{shutter_2}{shutter_1}.$$

13. The method of claim 9, wherein step (d) includes selectively repeating step (b) for at least some of said photodetectors determined at step (c) to be functioning marginally within their operational dynamic range.

14. The method of claim 9, further including adjusting bias potential to at least some photodetectors determined at step (c) to be functioning marginally within their operational dynamic range.

15. The method of claim 9, wherein step (c) includes at least one step selected from a group consisting of: (I) examination of images formed from luminosity components of said incoming optical energy detected by said photodetectors; (ii) mapping all said images to a common brightness level; and (iii) increasing dynamic range of said photodetectors by applying one of (1) non-linear transformation, (2) histographic equalization of normalized common brightness levels, and (3) a linear stretching function to said common brightness level; and wherein step (c) also after setting all brightness signals to a common brightness level, and assigning said common level of brightness as a final measure of brightness; wherein step (c) also after setting all brightness signals to a common brightness level, and assigning said common level of brightness as a final measure of brightness; and wherein step (c) also includes setting all brightness signals to a common brightness level, and using a most recently determined said common brightness level as a final measure of brightness.

16. The method of claim 9, wherein each step is carried out under microprocessor control using a microprocessor and memory fabricated on a common integrated circuit substrate containing at least said array of photodetectors.

17. A CMOS-implementable system to enhance dynamic range of an array of photodetectors responsive to incoming optical energy returned from an object a distance Z away to determine at least distance Z to said object, said photodetectors having a dynamic range in dB of DR before enhancement of dynamic range, the system including:
  means for enabling said photodetectors to receive said incoming optical energy during a long time interval;
  means for storing, within said long time interval at the end of each of a number n of unequal time duration sub-intervals, a detection output signal from each of said photodetectors, where n>1, wherein at least a pair of said unequal time duration sub-intervals, denoted shutter$_i$ and shutter$_{i-1}$, satisfy a relationship $$20 \cdot \log_{10} \frac{shutter_i}{shutter_{i-1}} \leq DR$$

and wherein adjacent said unequal time duration sub-intervals are separated from each other in a manner selected from a group consisting of (I) linearly, (ii) non-linearly, and (iii) logarithmically;
  means for determining a best quality one of n detection signals stored in said means for storing; and
  means for causing said means for storing and said means for determining to respectively store and determine as needed.

18. The system of claim 17, wherein if n=2, improvement G in dB of dynamic range of said photodetectors is given by $$G = 20 \cdot \log_{10} \frac{shutter_2}{shutter_1}.$$

19. The system of claim 17, wherein said means for determining includes examination of images formed at least one of (i) luminosity components of said incoming optical energy detected by said photodetectors, (ii) variation in ranges of Z in range images, and (iii) magnitude of signal-to-noise in ranges of Z in range images.

20. A CMOS-implementable system to enhance dynamic range of an array of photodetectors responsive to incoming optical energy returned from an object a distance Z away to determine at least distance Z to said object, said photodetectors having a dynamic range in dB of DR before enhancement of dynamic range, the system including:
  means for controllably enabling said photodetectors to receive said incoming optical energy during n sequential unequal time duration sub-intervals, wherein adjacent said unequal time duration sub-intervals are separated from each other in a manner selected from a group consisting of (i) linearly, (ii) non-linearly, and (iii) logarithmically;
  means for storing, at the end of each of said n unequal time duration sub-intervals, a detection output signal from each of said photodetectors, where n>1 and wherein at least a pair of said unequal time duration sub-intervals, denoted shutter$_i$ and shutter$_{i-1}$, satisfy relationship $$20 \cdot \log_{10} \frac{shutter_i}{shutter_{i-1}} \leq DR;$$

means for determining a best quality one of n detection signals stored in said means for storing; and
  means for selectively repeatedly enabling each of said photodetectors to receive said incoming optical energy for a time sub-interval associated with said best quality one of said n detection signals determined by said means for determining.

21. The system of claim 20, wherein if n=2, improvement G in dB of dynamic range of said photodetectors is given by $$G = 20 \cdot \log_{10} \frac{shutter_2}{shutter_1}.$$

22. The system of claim 20, wherein said means for determining includes examination of images formed at least one of (i) luminosity components of said incoming optical energy detected by said photodetectors, (ii) variation in ranges of Z in range images, and (iii) magnitude of signal-to-noise in ranges of Z in range images.

* * * * *